No. 826,580. PATENTED JULY 24, 1906.
F. E. KEYES.
BOILER FEED PURIFIER.
APPLICATION FILED NOV. 29, 1904.
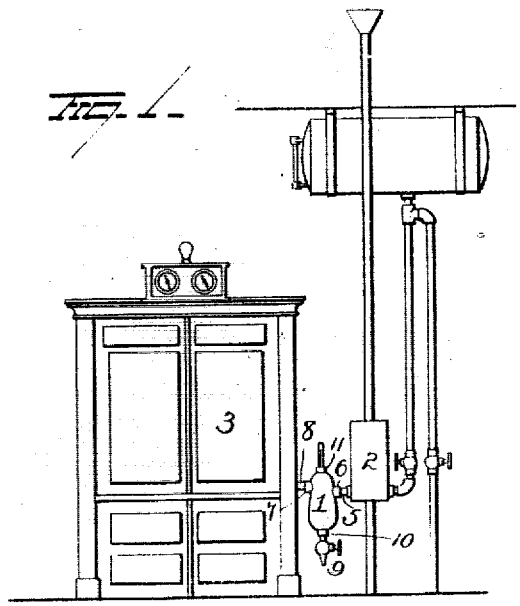
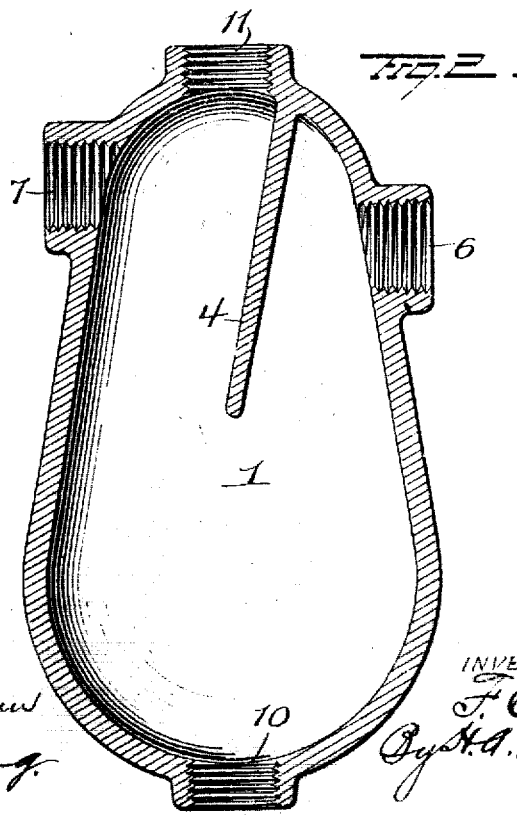
WITNESSES
INVENTOR
F. E. Keyes
By H. A. Seymour
Attorney

UNITED STATES PATENT OFFICE.

FRANK E. KEYES, OF NEW YORK, N. Y.

BOILER-FEED PURIFIER.

No. 826,580.

Specification of Letters Patent.

Patented July 24, 1906.

Application filed November 29, 1904. Serial No. 234,744.

*To all whom it may concern:*

Be it known that I, FRANK E. KEYES, a resident of New York, in the county of New York and State of New York, have invented certain new and useful Improvements in Boiler-Feed Purifiers; and I do hereby declare the following to be a full, clear, and exact description of the invention, such as will enable others skilled in the art to which it appertains to make and use the same.

My invention relates to an improved water-purifier, the object of the invention being to provide an improved purifier located between the feed-water heater and the boiler and adapted to remove all substances from the water which would otherwise form scale in the boiler; and the invention consists in certain novel features of construction and combinations and arrangements of parts, as will be more fully hereinafter described, and pointed out in the claims.

In the accompanying drawings, Figure 1 is a view in elevation, illustrating the location of my improved purifier; and Fig. 2 is an enlarged view, in vertical section, of the purifier, detached.

1 represents my improved purifier, which is located at a point between the feed-water-heating chamber 2 and the boiler 3. The purifier 1 comprises a chamber preferably larger at its bottom than at its top and provided with a partition or baffle-plate 4, extending from the top downward the desired distance and preferably disposed at a slight incline, as shown. A pipe 5 connects the feed-water heater 2 with an inlet-port 6 in chamber 1 near the top of the chamber, and an outlet 7 in the opposite side of the chamber and at a point higher up than inlet 6 is connected by a pipe 8 with boiler 3. A blow-off pipe 9 communicates with a port 10 in the bottom of chamber 1, and an opening 11 is provided in the top of the chamber to receive a thermometer to disclose the temperature of the water therein.

Hot water enters inlet 6 and is deflected downward by baffle-plate 4, causing the water to flow downward and deposit its scale-forming impurities in the bottom of the chamber, and this baffle-plate is slightly inclined and terminates some distance above the chamber-bottom and does not cause the impurities collected in the bottom of the chamber to be agitated by the flow of water.

The water after depositing its impurities in the chamber passes upward and out through outlet 7 and pipe 8 to the boiler.

The bottom of the purifier is larger than the top in order to quiet or still the water, so that impurities can settle quickly, and they can from time to time, as occasion may require, be blown out through port 10 in the bottom of the chamber, suitable cocks being of course provided to regulate the flow of the water.

Slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. Means for precipitating foreign matter contained in feed-water, consisting of a chamber, a partition depending into the upper portion of said chamber and terminating a considerable distance above the bottom the of, said chamber having an inlet-port below its upper end and opposite said partition, and having an outlet-port in the opposite wall on a higher plane than the inlet-port, whereby water entering the inlet-port will be deflected downwardly by said partition and the foreign matter precipitated to the bottom of the chamber.

2. A purifier for feed-water consisting of means for precipitating foreign matter contained in the water as the water travels, under pressure, from the inlet to the outlet of the purifier, said means comprising a shell larger at its lower end than at its upper end, said shell having a water-inlet below its top and a water-outlet below its top on a higher plane than the water-inlet and a partition depending into the upper portion of the shell between the water inlet and outlet, said partition terminating above the large bottom of the shell, whereby, as water passes from the inlet to the outlet around the lower end of the partition, foreign matter will be precipitated to the enlarged bottom of the shell.

3. A purifier for feed-water, comprising a shell, a partition in the upper portion of the shell and terminating a considerable distance above the bottom of the shell, the distance between said partition and the wall of the shell varying from the upper end of the shell downwardly, said shell having an inlet in one wall to discharge water under pressure directly against one face of said partition, said shell having a purified-water outlet opposite the other face of said partition, said shell also having an outlet in its bottom for removal of foreign matter precipitated to the bottom of the shell.

In testimony whereof I have signed this specification in the presence of two subscribing witnesses.

FRANK E. KEYES.

Witnesses:
CHAS. A. HAUCK,
J. D. MACFARLANE.